Patented Aug. 25, 1953

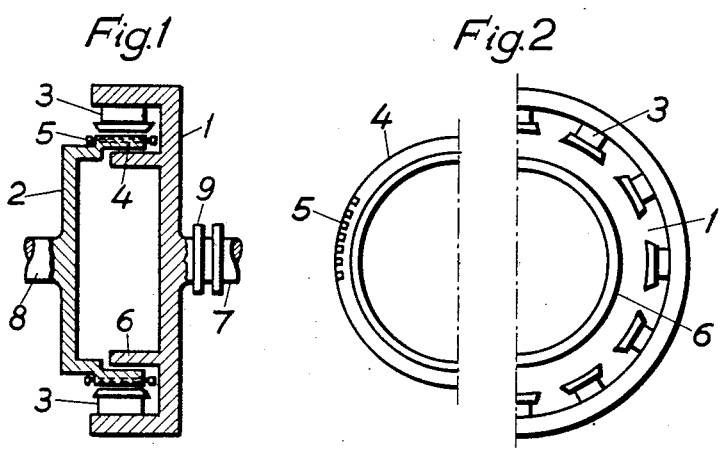

2,650,315

UNITED STATES PATENT OFFICE 2,650,315

ELECTROMAGNETIC SLIP COUPLING

Olav Karsten, Vasteras, Sweden, assignor to Allmänna Svenska Elektriska Aktiebolaget, Vasteras, Sweden, a Swedish corporation Application December 19, 1950, Serial No. 201,527
In Sweden December 27, 1949

3 Claims. (Cl. 310—105)

In the construction of electro-magnetic slip couplings it was sometimes impossible, with hitherto known embodiments, to minimize the moment of inertia of that member which was coupled to the driving motor, to such a value that is prescribed with respect to satisfactory operation conditions. That part of the slip coupling, which does not support any distinct poles (designated in the following description as secondary member), is provided with an armature and possibly with windings. In order to provide a return path for the magnetic flux, the armature iron must have a certain minimum thickness, viewed at right angles to the pole surfaces, at a given area of the armature, which determines the weight and the moment of inertia of the secondary member. This moment of inertia may be considerably minimized by a construction, which is the object of the present invention.

The principal feature of the invention is that the armature iron of the secondary member has less thickness, viewed at right angles to the pole surfaces, than that required for the magnetic flux, and that the primary member is provided with an additional iron ring compensating for the deficit in thickness of the armature iron. By this, the moment of inertia of the secondary member may be reduced arbitrarily. The increased magnetic resistance within the additional air gap between the armature and the iron ring may be overcome by slightly increasing the excitation of the poles. The armature may be solid or laminated and provided with windings on one or both sides. By this, the torque characteristic of the slip coupling may be set arbitrarily.

The invention will be explained reference being made to the accompanying drawing, wherein Fig. 1 shows by way of example diagrammatically a section of the coupling, and Fig. 2 one half of the primary and secondary members dismounted.

Designated by 1 is the primary member, by 2 the secondary member, by 3 the poles having primary windings (not shown), by 4 the armature which in the example shown supports secondary windings 5. The primary member 1 supports, according to the invention, an iron ring 6 lying as close as possible to the armature 4. Designated by 7 and 8 are shafts and by 9 slip rings for the supply of the exciting current to the poles 3. In the embodiment shown, the poles 3, the armature 4 and the iron ring 6 are so arranged that the magnetic flux through the air gap is directed radially. It is, however, also possible to so place these parts within the primary member 1 that said flux is directed axially. In this case, the armature and the additional iron body consist of ring discs.

Besides the fact that the moment of inertia of the secondary member is reduced owing to the new construction, also the magnetic radial pull of the slip coupling is minimized.

I claim as my invention:
1. An electro-magnetic slip coupling comprising a primary member, a system of poles supported by said member, a secondary member, an armature supported by the secondary member and having a thickness in a direction at right angles to the surface of the adjacent pole that is less than the thickness required to provide for the magnetic flux a passage through said armature in a circumferential direction, and an iron ring carried by said primary member and located in close proximity to the side of said armature remote from the said pole surfaces, said ring compensating for the lack of thickness in the armature iron and providing an additional circumferential passage for the magnetic flux.

2. An electro-magnetic slip coupling according to claim 1, wherein the said armature is of solid construction.

3. An electro-magnetic slip coupling according to claim 1, comprising windings for the said armature.

OLAV KARSTEN.

References Cited in the file of this patent

UNITED STATES PATENTS

| Number | Name | Date |
|---|---|---|
| 912,504 | Steckel | Feb. 16, 1909 |
| 982,789 | Bowie | Jan. 31, 1911 |
| 2,355,484 | Teker | Aug. 8, 1944 |
| 2,506,798 | Lilja | May 9, 1950 |
| 2,514,555 | Noxon | July 11, 1950 |
| 2,553,256 | Hollenbeck | May 15, 1951 |

FOREIGN PATENTS

| Number | Country | Date |
|---|---|---|
| 544,941 | Great Britain | May 4, 1942 |